| (12) | United States Patent<br>Lee et al. | (10) Patent No.: US 8,187,343 B2<br>(45) Date of Patent: May 29, 2012 |

(54) METHODS OF MANUFACTURING ELECTRIC DOUBLE LAYER CAPACITOR CELL AND ELECTRIC DOUBLE LAYER CAPACITOR AND APPARATUS FOR MANUFACTURING ELECTRIC DOUBLE LAYER CAPACITOR CELL

(75) Inventors: Sang Kyun Lee, Gyunggi-do (KR); Sung Ho Lee, Gyunggi-do (KR); Dong Sup Park, Gyunggi-do (KR); Yeong Su Cho, Gyunggi-do (KR); Chang Ryul Jung, Seoul (KR); Wan Suk Yang, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/923,829

(22) Filed: Oct. 8, 2010

(65) Prior Publication Data

US 2011/0197408 A1 Aug. 18, 2011

(30) Foreign Application Priority Data

Feb. 16, 2010 (KR) ........................ 10-2010-0013813

(51) Int. Cl.
*H01M 4/82* (2006.01)
(52) U.S. Cl. ......... 29/623.4; 438/171; 361/500; 427/79; 29/832
(58) Field of Classification Search .................. 257/516, 257/532, 924, E27.048, E23.057, E21.008, 257/E21.648; 438/4, 171, 190, 210, 238, 438/239, 250, 381, 393, 679, FOR. 430; 361/500, 502, 503, 523, 541; 427/79; 29/623.4–623.5, 832, 890.039
See application file for complete search history.

(56) References Cited

U.S. PATENT DOCUMENTS

| 5,727,604 A | * | 3/1998 | Koike et al. | 141/1.1 |
| 6,091,598 A | | 7/2000 | Kobayashi | |
| 6,314,638 B1 | * | 11/2001 | Kaido et al. | 29/730 |
| 6,359,769 B1 | * | 3/2002 | Mushiake et al. | 361/502 |

(Continued)

FOREIGN PATENT DOCUMENTS

JP 10-275736 10/1998

(Continued)

OTHER PUBLICATIONS

Korean Office Action issued May 11, 2011 in corresponding Korean Patent Application 10-2010-0013813.

*Primary Examiner* — Khiem D Nguyen
*Assistant Examiner* — Su Kim

(57) ABSTRACT

There are provided methods of manufacturing an electric double layer capacitor cell and an electric double layer capacitor and an apparatus for manufacturing an electric double layer capacitor cell. The method of manufacturing the electric double layer capacitor cell includes preparing first and second electrode sheets by printing electrode material onto conductive sheets, respectively, with the exception of regions to be provided as first and second terminal lead-out portions in the conductive sheets; punching the first and second electrode sheets so as to form a plurality of first and second unit electrodes, respectively, each first unit electrode having the first terminal lead-out portion and each second unit electrode having the second terminal lead-out portion; stacking the first and second electrode sheets with a separator interposed therebetween in order that the plurality of first and second unit electrodes are overlapped; and cutting the first and second electrode sheets being stacked into the first and second unit electrodes.

4 Claims, 9 Drawing Sheets

U.S. PATENT DOCUMENTS

| | | | |
|---|---|---|---|
| 6,459,564 B1 | 10/2002 | Watanabe et al. | |
| 6,885,545 B2 * | 4/2005 | Michel et al. | 361/502 |
| 7,251,122 B2 * | 7/2007 | Hinoki et al. | 361/502 |
| 7,846,220 B2 * | 12/2010 | Hatsuda | 29/623.5 |
| 2003/0003685 A1 * | 1/2003 | Schoch et al. | 438/455 |
| 2003/0110607 A1 * | 6/2003 | Bendale et al. | 29/25.03 |
| 2006/0126263 A1 * | 6/2006 | Tsunekawa et al. | 361/301.1 |
| 2009/0229860 A1 | 9/2009 | Shin et al. | |

FOREIGN PATENT DOCUMENTS

| | | |
|---|---|---|
| JP | 11-97285 | 4/1999 |
| JP | 2005-267870 | 9/2005 |
| JP | 2007-110061 | 4/2007 |
| KR | 1992-0018787 | 10/1992 |
| KR | 10-2009-0099275 | 9/2009 |

* cited by examiner

METHODS OF MANUFACTURING ELECTRIC DOUBLE LAYER CAPACITOR CELL AND ELECTRIC DOUBLE LAYER CAPACITOR AND APPARATUS FOR MANUFACTURING ELECTRIC DOUBLE LAYER CAPACITOR CELL

CROSS-REFERENCE TO RELATED APPLICATIONS

This application claims the priority of Korean Patent Application No. 10-2010-0013813 filed on Feb. 16, 2010, in the Korean Intellectual Property Office, the disclosure of which is incorporated herein by reference.

BACKGROUND OF THE INVENTION

1. Field of the Invention

The present invention relates to methods of manufacturing an electric double layer capacitor cell and an electric double layer capacitor and an apparatus for manufacturing an electric double layer capacitor cell, and more particularly, to methods of manufacturing an electric double layer capacitor cell and an electric double layer capacitor allowing for improved manufacturing yield and surface mounting and an apparatus for manufacturing an electric double layer capacitor cell.

2. Description of the Related Art

In various electronic products such as information communication devices, a stable energy supply is considered to be an important element. In general, such a function is performed by a capacitor. That is, the capacitor serves to store electricity in a circuit provided in various electronic products such as information communication devices and then discharge the electricity, thereby stabilizing the flow of electricity within the circuit. A general capacitor has a short charge and discharge time, a long lifespan, and high output density. However, since the general capacitor has low energy density, there is a limitation in using the capacitor as a storage device.

To overcome such a limitation, a new category of capacitors such as electric double layer capacitors have recently been developed, which have a short charge and discharge time and high output density. A great deal of attention is being paid to such capacitors as next generation energy devices together with secondary cells.

The electric double layer capacitor is an energy storage device using a pair of electrodes having different polarities. The electric double layer capacitor may perform continuous electrical charge and discharge cycles and have higher energy efficiency and output as well as greater durability and stability than other, more general capacitors. Accordingly, the electric double layer capacitor which may be charged and discharged with high current is being recognized as a storage device which may be charged and discharged at a high frequency, such as an auxiliary power supply for mobile phones, an auxiliary power supply for electric vehicles, and an auxiliary power supply for solar cells.

A basic structure of the electric double layer capacitor includes an electrode, an electrolyte, a current collector, and a separator. The electrode thereof, such as a porous electrode, has a relatively large surface area. The operational principle of the electric double layer capacitor is an electro-chemical mechanism in which electricity is generated when a voltage of several volts is applied to both ends of a unit cell electrode such that ions contained in the electrolyte move along an electric field to be adsorbed by an electrode surface.

SUMMARY OF THE INVENTION

An aspect of the present invention provides methods of manufacturing an electric double layer capacitor cell and an electric double layer capacitor allowing for improved manufacturing yield and surface mounting and an apparatus for manufacturing an electric double layer capacitor cell.

According to an aspect of the present invention, there is provided a method of manufacturing an electric double layer capacitor cell, the method including: preparing first and second electrode sheets by printing electrode material onto conductive sheets, respectively, with the exception of regions to be provided as first and second terminal lead-out portions in the conductive sheets; punching the first and second electrode sheets so as to form a plurality of first and second unit electrodes, respectively, each first unit electrode having the first terminal lead-out portion and each second unit electrode having the second terminal lead-out portion; stacking the first and second electrode sheets with a separator interposed therebetween in order that the plurality of first and second unit electrodes are overlapped; and cutting the first and second electrode sheets being stacked into the first and second unit electrodes.

The punching of the first and second electrode sheets may include forming connection portions in order to make connections between adjacent unit electrodes among the first unit electrodes or the second unit electrodes.

The punching of the first and second electrode sheets may include forming a terminal lead-out portion between two adjacent unit electrodes among the first unit electrodes or the second unit electrodes and the cutting of the first and second electrode sheets may include cutting the terminal lead-out portion so that cut terminal lead-out portions are provided to the two unit electrodes, respectively.

The separator may have openings to expose the first and second terminal lead-out portions.

The first and second terminal lead-out portions may be stacked to be led toward an opposite direction.

The cutting of the first and second electrode sheets may include cutting the connection portions formed between the adjacent unit electrodes.

The method may further include stacking a plurality of first electrode sheets, separators and second electrode sheets, and forming a fixing member binding a plurality of first or second terminal lead-out portions being stacked.

According to another aspect of the present invention, there is provided an apparatus for manufacturing an electric double layer capacitor cell, the apparatus including: a printing part including a first roller supplying a conductive sheet, a second roller winding the conductive sheet, and an electrode material dispenser supplying electrode material to the conductive sheet with the exception of a predetermined space while the conductive sheet is moved; a punching part including a puncher forming a plurality of unit electrodes in an electrode sheet supplied by the second roller, each unit electrode having a terminal lead-out portion; a stacking part having a plurality of electrode sheets stacked with a separator interposed therebetween; and a cutting part including a cutter cutting the plurality of electrode sheets being stacked into the plurality of unit electrodes.

The printing part may include a plurality of electrode material dispensers.

The punching part may include first and second punchers having difference patterns.

The stacking part may include a table having the plurality of terminal lead-out portions disposed thereon and including an insertion hole, and a pressurizer applying pressure to a fixing member disposed above the plurality of terminal lead-out portions and binding the plurality of terminal lead-out portions through the insertion hole.

According to another aspect of the present invention, there is provided a method of manufacturing an electric double layer capacitor, the method including: forming a lower case including a housing space of which a top surface is opened by integrating insulating resin and first and second external terminals, each of the first and second external terminals having a first surface exposed to the housing space and a second surface exposed to an outside of the lower case; preparing first and second electrode sheets by printing electrode material onto conductive sheets, respectively, with the exception of regions to be provided as first and second terminal lead-out portions in the conductive sheets; punching the first and second electrode sheets so as to form a plurality of first and second unit electrodes, respectively, each first unit electrode having the first terminal lead-out portion and each second unit electrode having the second terminal lead-out portion; stacking the first and second electrode sheets with a separator interposed therebetween in order that the plurality of first and second unit electrodes are overlapped; preparing an electric double layer capacitor cell by cutting the first and second electrode sheets being stacked into the first and second unit electrodes; mounting the electric double layer capacitor cell in the housing space such that the electric double layer capacitor cell is electrically connected to the first surface; and mounting an upper cap on the lower case so as to cover the housing space.

The forming of the lower case may be performed by insert injection molding.

The electric double layer capacitor cell may include a first current collector having a first terminal lead-out portion, a second current collector having a second terminal lead-out portion, a first electrode formed on the first current collector, a second electrode formed on the second current collector and a separator disposed between the first and second electrodes. The first and second terminal lead-out portions may be electrically connected to the first surface of the first and second external terminals.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
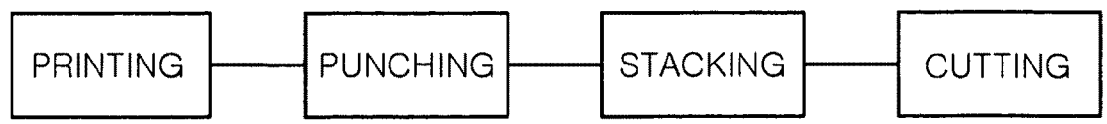
FIG. 1 is a flowchart illustrating a method of manufacturing an electric double layer capacitor cell according to an exemplary embodiment of the present invention.

Exemplary embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art. It should be considered that the shapes and dimensions of elements in the drawings may be exaggerated for clarity. Throughout the drawings, the same reference numerals will be used to designate the same or like elements.

FIG. 1 is a flowchart illustrating a method of manufacturing an electric double layer capacitor cell according to an exemplary embodiment of the present invention. FIGS. 2A through 2F are cross-sectional views illustrating each process in a method of manufacturing an electric double layer capacitor cell according to an exemplary embodiment of the present invention.

Figure 2A:
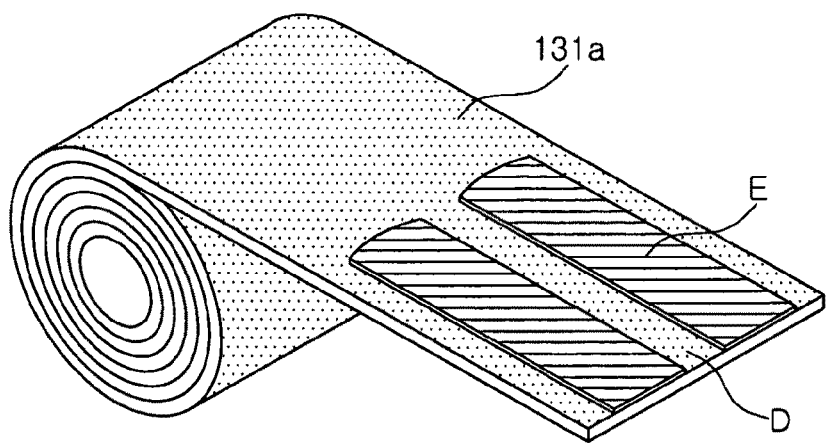
FIGS. 2A through 2F are cross-sectional views illustrating each process in a method of manufacturing an electric double layer capacitor cell according to an exemplary embodiment of the present invention.

First of all, as shown in FIG. 2A, a first electrode sheet 130 is prepared by printing electrode material E onto a first conductive sheet 131a. Here, the electrode material may be printed onto the first conductive sheet 131a with the exception of a predetermined space. A region D, in which the electrode material E is unprinted, is provided as a terminal lead-out portion.

The first conductive sheet 131a serves as a current collector for transferring an electrical signal to the electrode material and allowing for the migration of an electron induced by the electrode material. The first conductive sheet 131a may be formed of a conductive polymer or a metallic foil, but is not limited thereto.

The electrode material is not particularly limited, and electrode materials known in the art to which the invention pertains may be used. For example, the electrode material may be prepared by mixing activated carbon, carbon aerogel, conductive material, a binder or the like.

Figure 2B:
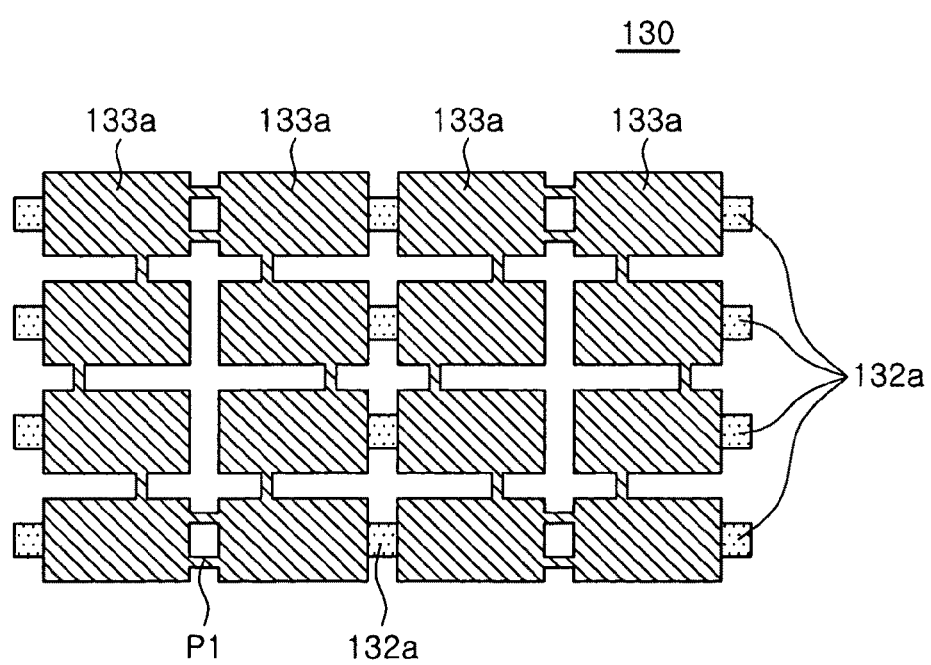

Next, as shown in FIG. 2B, the region D, in which the electrode material is unprinted, is provided as a first terminal lead-out portion 132a, and the first electrode sheet 130 is punched to form a plurality of first unit electrodes 133a.

The first terminal lead-out portion 132a may be formed on a surface of each of the first unit electrodes 133a. The first terminal lead-out portion 132a may be formed between two adjacent first unit electrodes 133a and be cut in a cutting process so that the cut first terminal lead-out portions 132 may be provided to the two first unit electrodes 133a, respectively. Hereinafter, the first terminal lead-out portion after being cut may be referred to as '132' and the second terminal lead-out portion after being cut may be referred to as '142'.

In the punching process, a first connection portion P1 may be formed between the first unit electrodes 133a. Accordingly, the punching process may be performed in such a manner that the plurality of first unit electrodes 133a are connected to each other.

Figure 2C:
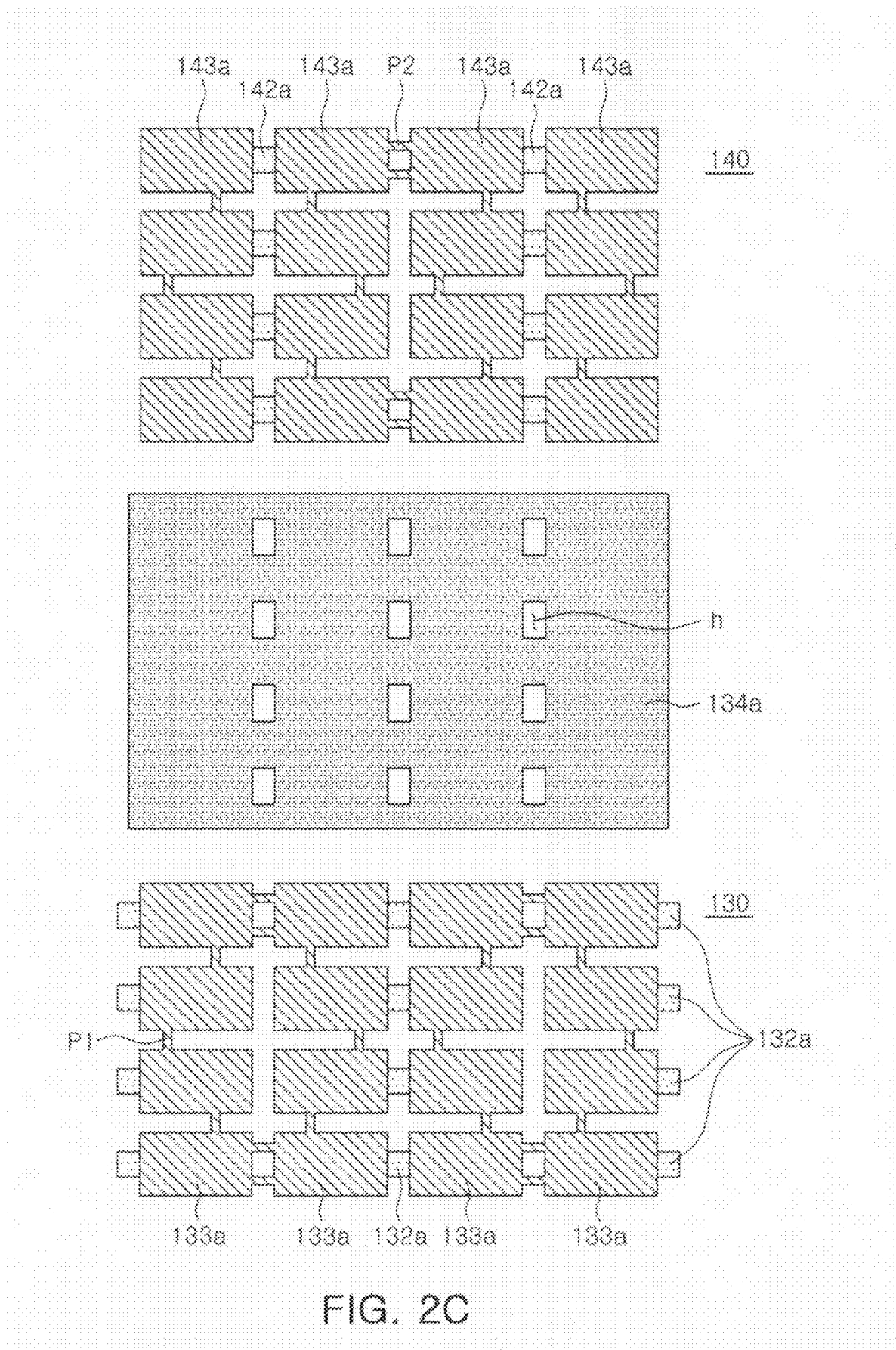

Thereafter, as shown in FIG. 2C, a second electrode sheet 140 including a plurality of second unit electrodes 143a, each having a second terminal lead-out portion 142a, and a separator 134a are prepared. The second electrode sheet 140 may be prepared in the same manner as the first electrode sheet 130. That is, the second electrode sheet 140 may be prepared by printing electrode material onto a second conductive sheet 141a.

The separator 134a may have openings h to expose the first terminal lead-out portion 132a and the second terminal lead-out portion 142a.

The material of the separator 134a is not particularly limited, as long as it may be a porous material through which ions included in an electrolyte can permeate. For example, a porous material such as polypropylene, polyethylene, or glass fiber may be used.

Figure 2D:
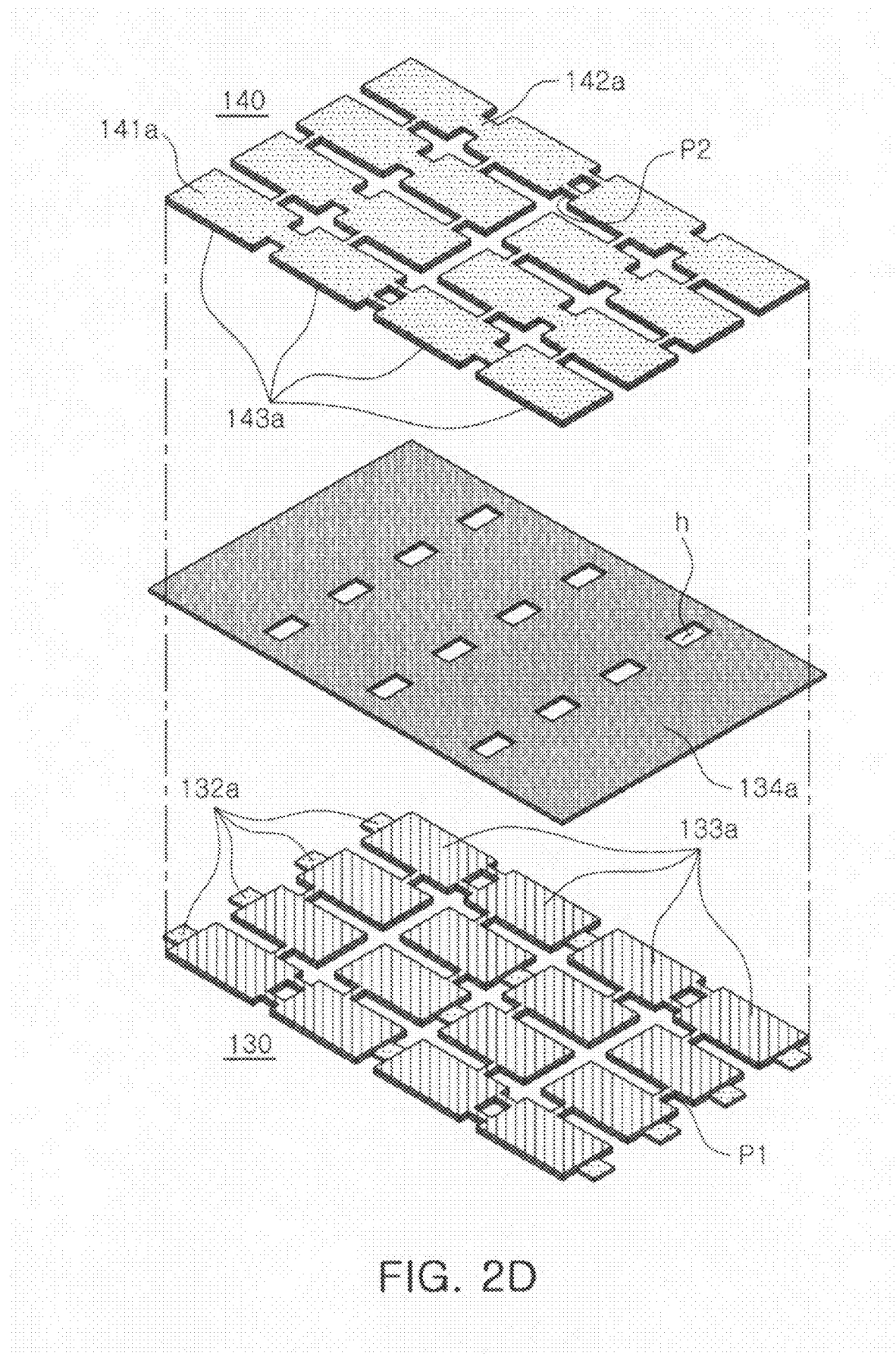
Figure 2E:
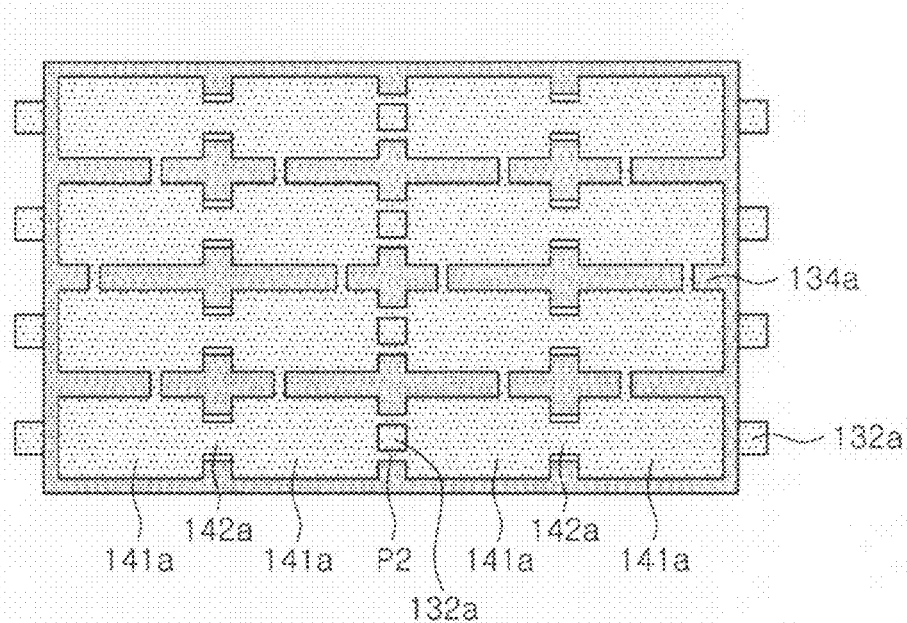

Then, as shown in FIGS. 2D and 2E, the first electrode sheet 130, the separator 134a and the second electrode sheet 140 are sequentially stacked. In the stacking process, the first and second unit electrodes 133a and 143a face each other.

At this time, the first and second electrode sheets 130 and 140 are stacked to have the first and second unit electrodes 133a and 143a overlapped.

Also, the first and second terminal lead-out portions 132a and 142a are stacked to be led toward an opposite direction. The first and second terminal lead-out portions 132a and 142a may be exposed through the openings h formed on the separator 134a. The exposed first and second terminal lead-out portions 132a and 142a are electrically connected to an external terminal in a packaging process.

Figure 2F:
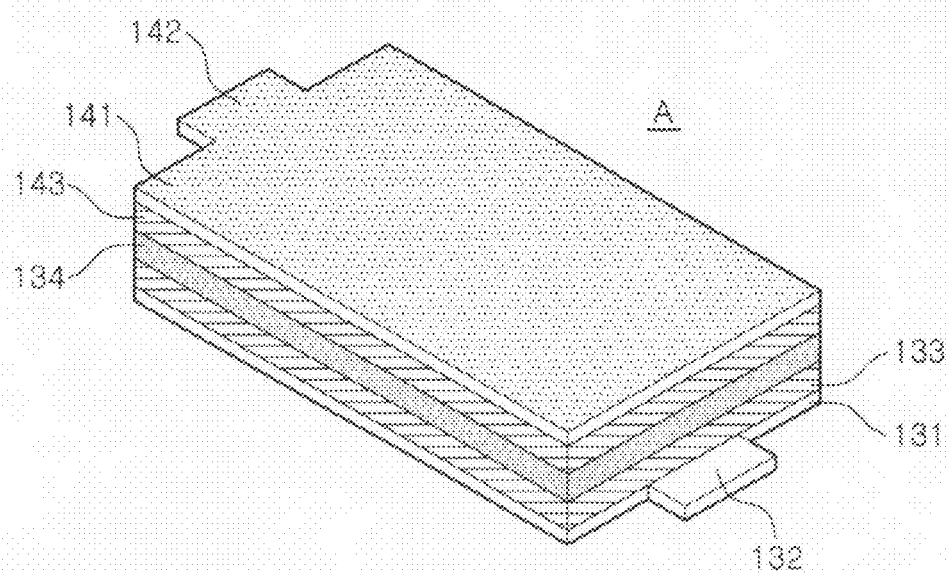

Then, as shown in FIG. 2F, the stacked first and second electrode sheets 130 and 140 may be cut so as to be divided according to stacked unit electrodes. Throughout the above processes, an electric double layer capacitor cell A is manufactured.

The electric double layer capacitor cell A may include a first current collector 131 having a first terminal lead-out portion 132, a second current collector 141 having a second terminal lead-out portion 142, a first unit electrode 133 formed on the first current collector 131, a second unit electrode 143 formed on the second current collector 141, and a separator 134 interposed between the first and second unit electrodes 133 and 143.

In the cutting process, first and second connection portions P1 and P2, formed between the plurality of first and second unit electrodes 133a and 143a, respectively, may be cut. This facilitates the cutting process according to unit electrodes. Also, a terminal lead-out portion, formed between adjacent unit electrodes, may be cut such that the cut terminal lead-out portions are provided to the unit electrodes, respectively.

As described above, there is provided a method of manufacturing an electric double layer capacitor unit cell having a single first unit electrode and a single second unit electrode stacked with a single separator interposed therebetween.

Although not shown, an electric double layer capacitor cell having high electrostatic capacity may be manufactured by stacking a plurality of electric double layer capacitor unit cells, each of which includes a first current collector, a second current collector, a first unit electrode formed on the first current collector, a second unit electrode formed on the second current collector, and a separator interposed between the first and second electrodes.

For example, a double-sided electrode is formed by printing electrode material onto both surfaces of a second conductive sheet, and may be used for stacking a second electric double layer capacitor unit cell.

Here, as the plurality of electric double layer capacitor unit cells being stacked are accurately aligned, high electrostatic capacity may be achieved.

In this embodiment, the plurality of electric double layer capacitor unit cells are stacked, and the plurality of stacked first terminal lead-out portions or stacked second terminal lead-out portions may be bound by a fixing member.

A method of forming a fixing member will be described in more detail hereafter. The fixing member contributes to the non-distortion in the alignment of the plurality of stacked electric double layer capacitor unit cells and the transfer thereof to a cutting process, whereby the cutting process may be facilitated.

The electric double layer capacitor cell according to this embodiment may be manufactured by an apparatus to be described below.

Hereinafter, an apparatus for manufacturing an electric double layer capacitor cell according to an exemplary embodiment of the invention will be described with reference to FIGS. 2A through 2F, 3, 4A and 4B.

Figure 3:
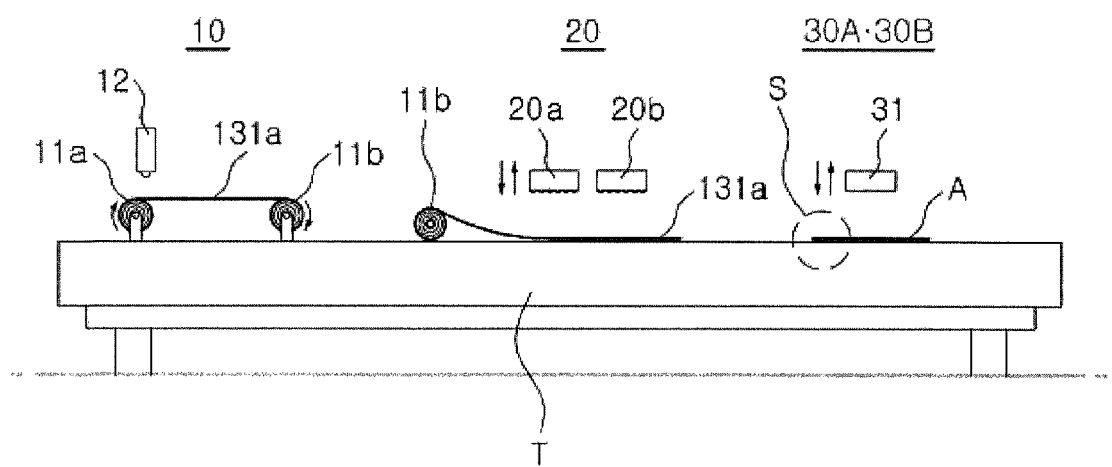
FIG. 3 is a schematic cross-sectional view illustrating an apparatus for manufacturing an electric double layer capacitor cell according to an exemplary embodiment of the present invention.
Figure 4A:
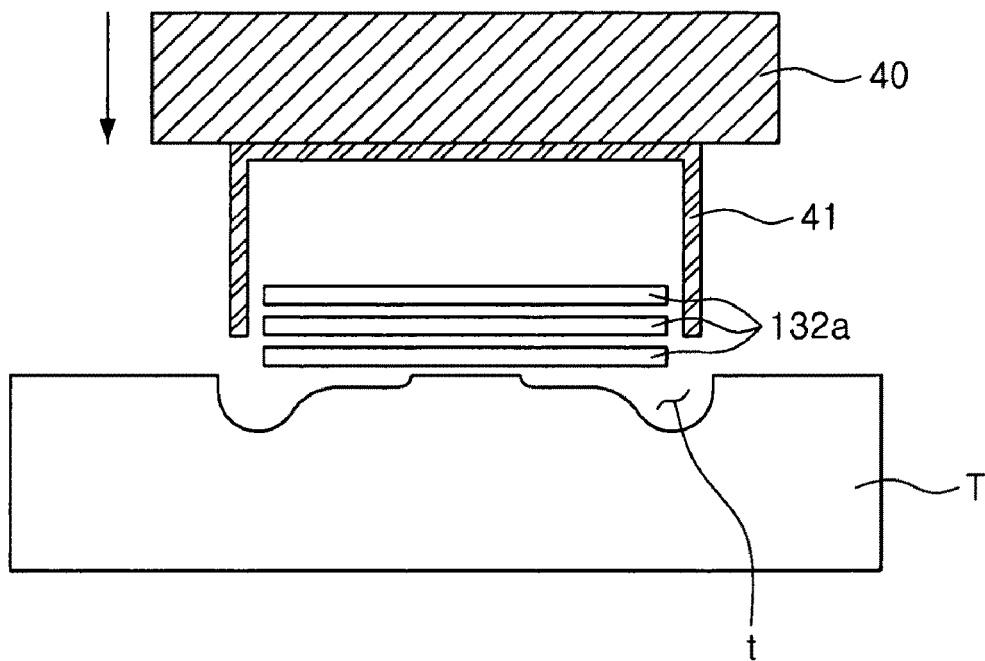
FIGS. 4A and 4B are schematic cross-sectional views illustrating part of an apparatus for manufacturing an electric double layer capacitor cell according to an exemplary embodiment of the present invention.
Figure 4B:
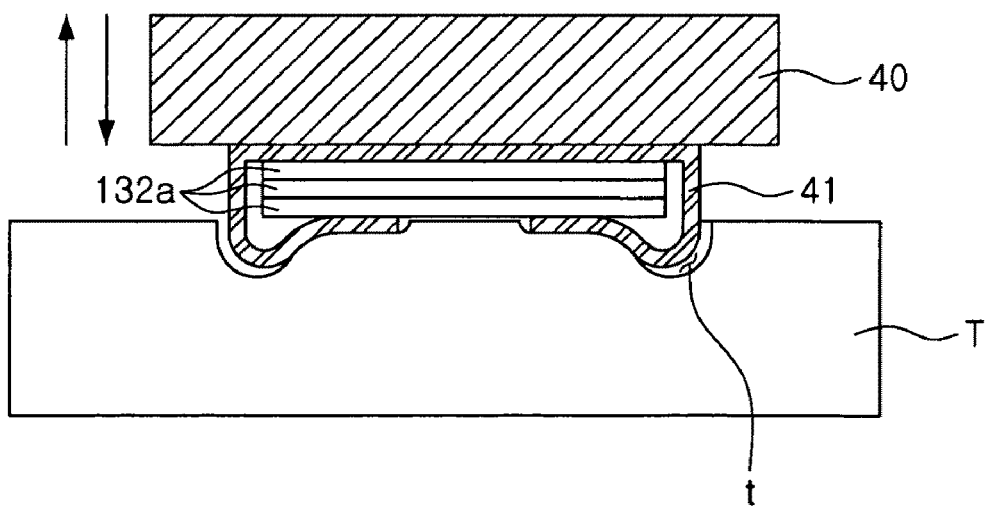

FIG. 3 is a schematic cross-sectional view illustrating an apparatus for manufacturing an electric double layer capacitor cell according to an exemplary embodiment of the present invention. FIGS. 4A and 4B are schematic cross-sectional views illustrating part of an apparatus for manufacturing an electric double layer capacitor cell according to an exemplary embodiment of the present invention.

An apparatus for manufacturing an electric double layer capacitor cell according to this embodiment may include a printing part 10, a punching part 20, and a stacking and cutting part including a stacking part 30A and a cutting part 30B.

The printing part 10 according to this embodiment may include a first roller 11a supplying the first conductive sheet 131a, a second roller 11b winding the first conductive sheet 131a, and an electrode material dispenser 12 supplying electrode material to the first conductive sheet 131a.

The first conductive sheet 131a wound about the first roller 11a is unwound to be supplied to the second roller 11b. The second roller 11b winds the first conductive sheet 131a. The first and second rollers 11a and 11b are disposed to have a predetermined space therebetween, and the first conductive sheet 131a is printed with the electrode material supplied by the electrode material dispenser 12 while it is moved from the first roller 11a to the second roller 11b. The electrode material may be printed onto the first conductive sheet 131a with a predetermined space D unprinted. The printing process may be performed by causing the first conductive sheet 131a to pass below a single electrode material dispenser. Otherwise, a plurality of electrode material dispensers are provided in the printing part to have a predetermined space therebetween and the printing process may be simultaneously performed by using the plurality of electrode material dispensers.

The first conductive sheet 131a with the electrode material printed thereupon may be unwound about the second roller 11b after a drying process. To enable this, a separate dryer may be provided between the first and second rollers 11a and 11b. Hereinafter, a conductive sheet with electrode material printed thereon is referred to as an 'electrode sheet.'

The first electrode sheet 130 wound about the second roller 11b is transferred to the punching part 20. In the punching part 20, first and second punchers 20a and 20b are provided. The first puncher 20a punches the first electrode sheet 130 to thereby form the plurality of first unit electrodes 133a, each of which has the first terminal lead-out portion 132a.

The patterns of the punchers 20a and 20b are adjusted to manufacture an electrode sheet including a plurality of unit electrodes, each having a terminal lead-out portion. The punching process may be performed in such a manner that a region having a predetermined space, in which the electrode material is unprinted, is provided as the terminal lead-out portion, and the electrode sheet may be cut to be uniform size.

Also, the first connection portions P1 are provided between the plurality of first unit electrodes 133a, so the punching process may be performed such that the plurality of first unit electrodes 133a are connected to each other by the first connection portions P1.

The second electrode sheet 140 may be manufactured in the same manner.

In this embodiment, the first and second punchers 20a and 20b may have different patterns.

The first puncher 20a may be used to manufacture the first electrode sheet 130 and the second puncher 20b may be used to manufacture the second electrode sheet 140. The first and second electrode sheets 130 and 140 may have respective terminal lead-out portions at different positions. This may be implemented by the first and second punchers 20a and 20b having appropriate patterns therefor.

The first and second electrode sheets 130 and 140 being punched are transferred to the stacking and cutting part. The punched first electrode sheet 130, the separator 134a and the punched second electrode sheet 140 are sequentially stacked in the stacking part 30A. Although not shown, the first and second electrode sheets 130 and 140 may be transferred from the punching part 20 to the stacking part 30A by a transfer jig, and be stacked in the stacking part 30A.

In the cutting part 30B, a cutter 31 is provided to cut a stack including the first electrode sheet 130, the separator 134a and the second electrode sheet 140 into the stacked first and second unit electrodes 133 and 143. The cutter 31 may be designed to cut the first and second connection portions P1 and P2 formed between the plurality of unit electrodes. The cutting of the first and second connection portions P1 and P2 may facilitate divisions according to unit electrodes.

As described above, the electric double layer capacitor cell A is manufactured.

In this embodiment, a plurality of first electrode sheets, separators and second electrode sheets may be stacked.

Here, as the plurality of electric double layer capacitor unit cells being stacked are accurately aligned, high electrostatic capacity may be achieved.

FIGS. 4A and 4B are schematic cross-sectional views illustrating part S of a stacking part included in an apparatus for manufacturing an electric double layer capacitor cell.

The stacking part 30A may include a table T having an insertion hole t for a fixing member 41 therein, and a pressurizer 40 applying pressure to the fixing member 41.

Hereinafter, the first electrode sheet 130 will be described as an example. The plurality of first electrode sheets 130 are stacked. At this time, the plurality of stacked first terminal lead-out portions 132a are disposed on the table T having the insertion hole t. The fixing member 41 is disposed between the plurality of first terminal lead-out portions 132a and the pressurizer 40. When the pressurizer 40 moves downwardly, it applies pressure to the fixing member 41. The fixing member 41 binds the plurality of first terminal lead-out portions 132a due to the insertion hole t of the table T. The alignment of the plurality of stacked electric double layer capacitor unit cells is accomplished without distortion due to the fixing member 41, and the cutting process may be facilitated thereby.

Hereinafter, a method of manufacturing an electric double layer capacitor according to an exemplary embodiment of the invention will be described in detail.

Figure 5A:
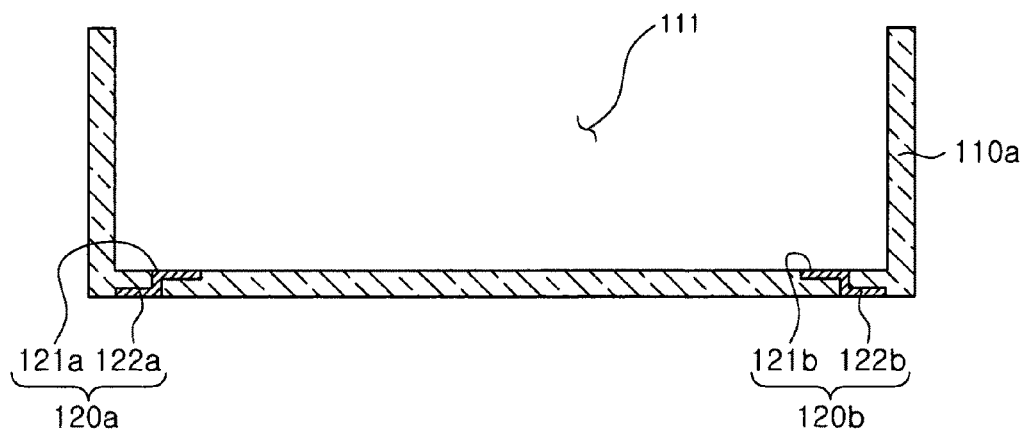
FIGS. 5A through 5C are cross-sectional views illustrating each process in a method of manufacturing an electric double layer capacitor according to an exemplary embodiment of the present invention.
Figure 5B:
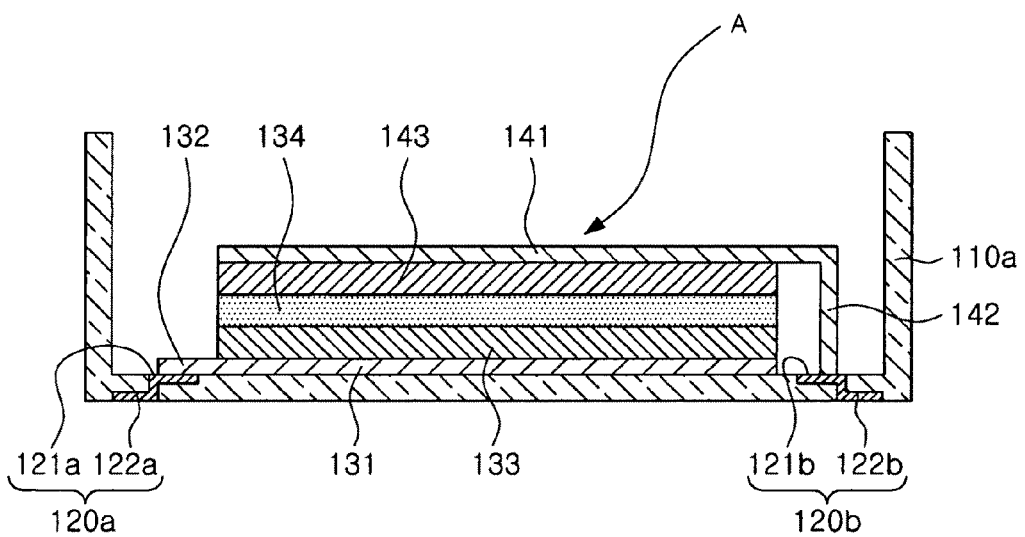
Figure 5C:
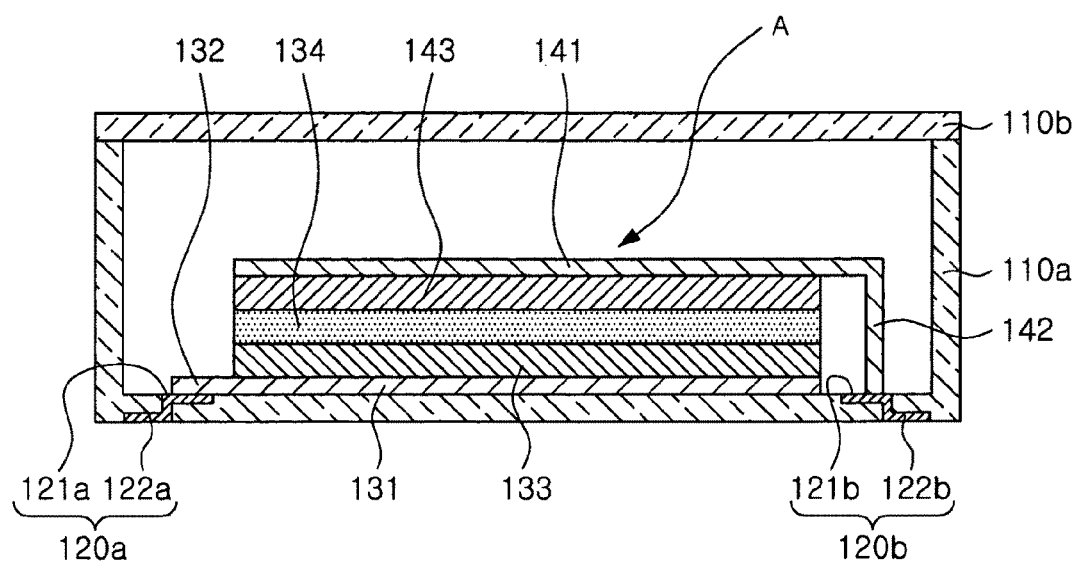
Figure 5D:
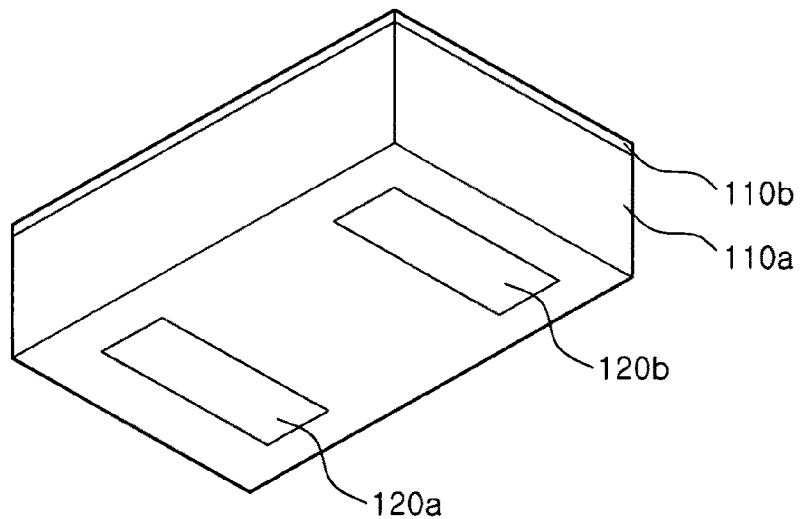
FIG. 5D is a schematic perspective view illustrating an electric double layer capacitor according to an exemplary embodiment of the present invention.

FIGS. 5A through 5C are cross-sectional views illustrating each process in a method of manufacturing an electric double layer capacitor according to an exemplary embodiment of the present invention. FIG. 5D is a schematic perspective view illustrating an electric double layer capacitor according to an exemplary embodiment of the present invention.

First of all, as shown in FIG. 5A, a lower case 110a is formed such that the lower case 110a has an opened housing space 111 and includes first and second external terminals 120a and 120b buried therein. The first external terminal 120a has a first surface 121a exposed to the housing space 111 and a second surface 122a exposed to the outside of the lower case 110a. The second external terminal 120b has a first surface 121b exposed to the housing space 111 and a second surface 122b exposed to the outside of the lower case 110a.

The process of forming the lower case 110a is not specifically limited, as long as insulating resin and the first and second external terminals 120a and 120b may be integrally molded so that the first and second external terminals 120a and 120b are buried in the insulating resin. For example, insert injection molding may be applied.

More specifically, the first and second external terminals 120a and 120b are disposed in a mold having a desired lower-case shape, and the insulating resin is injected into the mold. The insulating resin injected into the mold hardens with the first and second external terminals 120a and 120b in the mold through cooling or cross-linking. The insulating resin and the first and second external terminals 120a and 120b are integrated by the insert injection molding, even though the first and second external terminals 120a and 120b are formed of a different material from the insulating resin.

Examples of the insulating resin may include polyphenylene sulfide (PPS) or liquid crystal polymer (LCP). Accordingly, an electric double layer capacitor may protect its internal structure during a surface mounting (SMT) process which is performed at a high temperature of about 240° C. to 270° C.

Next, as shown in FIG. 5B, the electric double layer capacitor cell A is mounted in the housing space 111 so as to be electrically connected to the first surfaces 121a and 121b of the first and second external terminals 120a and 120b exposed to the housing space 111 of the lower case 110a.

The electric double layer capacitor cell A may be manufactured according to the method as described above.

The electric double layer capacitor cell A may be a single electric double layer capacitor unit cell. The electric double layer capacitor unit cell A may include the first current collector 131 having the first terminal lead-out portion 132, the second current collector 141 having the second terminal lead-out portion 142, the first unit electrode 133 formed on the first current collector 131, the second unit electrode 143 formed on the second current collector 141, and the separator 134 interposed between the first and second unit electrodes 133 and 143.

Although not shown, one or more electric double layer capacitor unit cells may be stacked.

In this embodiment, the electric double layer capacitor cell A is electrically connected to the first and second external terminals 120a and 120b through the first and second terminal lead-out portions 132 and 142 of the first and second current collectors 131 and 141. The shapes of the first and second terminal lead-out portions 132 and 142 may be properly modified in order that they may be electrically connected to the first and second external terminals 120a and 120b. As shown in FIG. 5B, the second terminal lead-out portion 142 may have a partially bent shape so as to be connected to the second external terminal 120b.

Such a modification may be influenced by the positions of the first and second external terminals 120a and 120b and the shape or size of the electric double layer capacitor cell A.

Then, as shown in FIG. 5C, the lower case 110a having the electric double layer capacitor cell A mounted therein is filled with an electrolyte. Here, an aqueous electrolyte or nonaqueous electrolyte may be used. Thereafter, an upper cap 110b is mounted on the lower case 110a so as to cover the housing space 111.

FIG. 5D is a schematic perspective view illustrating an electric double layer capacitor according to an exemplary embodiment of the present invention.

As described above, the electric double layer capacitor according to this embodiment has a structure such that the first and second external terminals 120a and 120b are buried in the lower case 110a. Therefore, its space utilization efficiency increases. Accordingly, it is possible to increase the stacking degree of the electric double layer capacitor cell mounted in the electric double layer capacitor. Furthermore, the electric double layer capacitor may be surface-mounted without any additional structure.

As set forth above, according to exemplary embodiments of the invention, mass production of an electric double layer capacitor cell is achieved by which a plurality of unit electrodes are formed, stacked and cut, and manufacturing yield is enhanced.

An electric double layer capacitor has a structure such that first and second external terminals are buried in a lower case, so its space utilization efficiency increases. Accordingly, it is possible to increase the stacking degree of the electric double layer capacitor cells mounted in the electric double layer capacitor. Furthermore, the electric double layer capacitor can be surface-mounted without any additional structure.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for manufacturing an electric double layer capacitor cell, the apparatus comprising:
   a printing part including a first roller supplying a conductive sheet, a second roller winding the conductive sheet, and an electrode material dispenser supplying electrode material to the conductive sheet with the exception of a predetermined space while the conductive sheet is moved;
   a punching part including a puncher forming a plurality of unit electrodes in an electrode sheet supplied by the second, roller, each unit electrode having a terminal lead-out portion;
   a stacking part having a plurality of electrode sheets stacked with a separator interposed therebetween; and
   a cutting part including a cutter cutting the plurality of electrode sheets being stacked into the plurality of unit electrodes.

2. The apparatus of claim 1, wherein the printing part includes a plurality of electrode material dispensers.

3. The apparatus of claim 1, wherein the punching part includes first and second punchers having difference patterns.

4. The apparatus of claim 1, wherein the stacking part comprises:
   a table having the plurality of terminal lead-out portions disposed thereon and including an insertion hole; and
   a pressurizer applying pressure to a fixing member disposed above the plurality of terminal lead-out portions and binding the plurality of terminal lead-out portions through the insertion hole.

\* \* \* \* \*

UNITED STATES PATENT AND TRADEMARK OFFICE
CERTIFICATE OF CORRECTION

PATENT NO. : 8,187,343 B2  
APPLICATION NO. : 12/923829  
DATED : May 29, 2012  
INVENTOR(S) : Sang Kyun Lee et al.

Page 1 of 1

It is certified that error appears in the above-identified patent and that said Letters Patent is hereby corrected as shown below:

Column 10, Line 12, In Claim 1, delete "second," and insert -- second --, therefor.

Signed and Sealed this
Twenty-eighth Day of August, 2012

David J. Kappos
*Director of the United States Patent and Trademark Office*